Patented Oct. 3, 1950

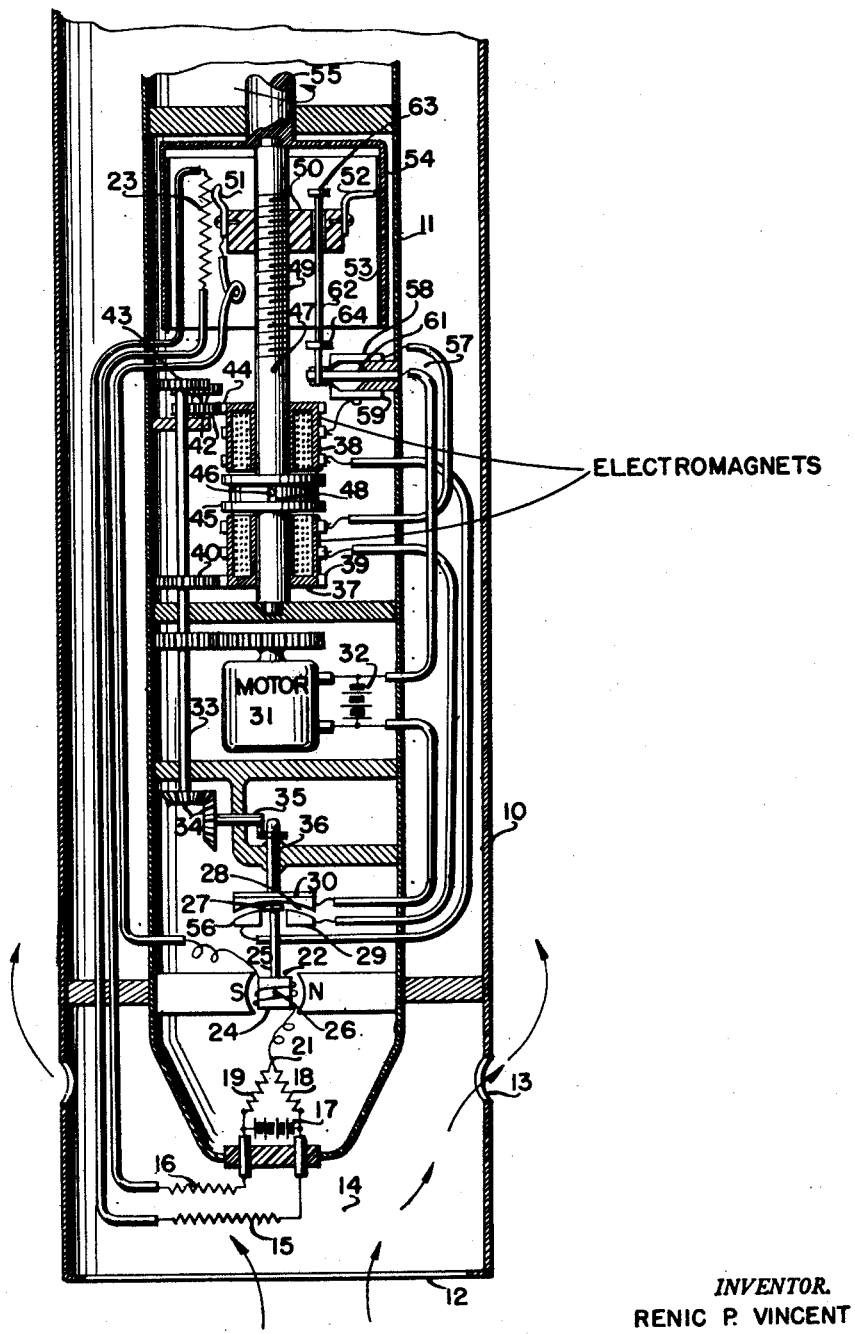

2,524,150

UNITED STATES PATENT OFFICE 2,524,150

WELL LOGGING APPARATUS

Renie P. Vincent, Tulsa, Okla., assignor to Stanolind Oil and Gas Company, Tulsa, Okla., a corporation of Delaware Application August 31, 1948, Serial No. 47,068

4 Claims. (Cl. 73—155)

This invention pertains to an improvement in well logging instruments. More particularly, this invention relates to a null type instrument for making a substantially continuous log of a well wherein variations in a well characteristic unbalance a balanced electric circuit and the adjustment required to rebalance the circuit is recorded as a function of the well characteristic.

In my copending joint application S. N. 723,480, filed January 22, 1947, a measuring instrument for wells was disclosed. In that application an automatic means for balancing an electrical circuit such as a Wheatstone bridge or a potentiometer was disclosed. The measuring instrument described in the previous joint application was, however, limited to an intermittent balancing and recording device. In many instances a substantially continuously recording automatic balancing circuit is desirable.

It is therefore an object of this invention to provide an improved well logging apparatus. A more specific object of this invention is to provide an improved well logging instrument of the type employing a balancing circuit wherein a well characteristic is indicated by the unbalance in said circuit. A further object of this invention is to provide an improved apparatus for indicating variations in the fluid velocity in a well. A still further and more specific object of this invention is to provide a well logging instrument in which an element of a balancing circuit is varied by a well characteristic, the circuit is rebalanced in the well, and the adjustment necessary to rebalance the circuit is recorded as an indication of variations in a well characteristic. These objects will become manifest and additional objects will be apparent as the description of the invention proceeds. In this description, reference will be made to the accompanying schematic diagram of a preferred embodiment of my invention.

Referring to this drawing, the well logging instrument consists essentially of an outer case 10, which is adapted to protect the working elements from contamination by well fluids as well as from exposure to the high pressures encountered in a deep well, a framework 11, mounted in the outer case 10, and detecting and recording elements supported in said framework. An opening 12 in the lower end of case 10 and outlet ports 13 in the side walls of the case provide a means by which circulation of fluids through the lower compartment 14 of the instrument may be established. In the preferred embodiment of this invention the instrument is adapted to measuring fluid velocities in wells. In such an embodiment the sensitive elements of a balancing circuit; for example, two resistances 15 and 16 of a Wheatstone bridge circuit are disposed within the compartment 14 of the instrument and in the fluid flow stream. These resistances are preferably made from a material such as platinum having a high temperature coefficient of resistance.

It is generally desirable to compensate the balancing circuit for temperature changes within the well. This may be accomplished by, for example, selecting a resistance 16 having a substantially greater diameter than resistance 15, equal total resistances being provided by the increased length of resistance 16 with respect to resistance 15. Thus, the radiation area of resistance 16 being substantially greater than the area of resistance 15, when resistances 15 and 16 are energized by a battery 17, the temperature of resistance 15 is substantially higher than the temperature of resistance 16 and of the well fluids surrounding the instrument. This resistance 15, being hotter than the well fluids, is sensitive to the velocity of the well fluids—the higher the velocity the greater the heat loss and accordingly the lower the resistance. The other arms 18 and 19 of the Wheatstone bridge which are preferably made of a temperature insensitive material such as manganin, are connected at the bridge terminal 21 through a measuring instrument such as a galvanometer 22 to the slider of a variable resistance 23, this variable resistance being disposed between resistances 15 and 16 as indicated. It will thus be apparent that as the velocity of a fluid through the compartment 14 varies, the conductivity of resistance 15 varies and such variations will tend to unbalance a previously balanced bridge thus deflecting the armature 24 of galvanometer 22.

As the galvanometer armature 24 is deflected, the associated indicator 25 will be deflected to the right or left about the axis 26 of the armature. A conducting element, hereinafter referred to as a pole 27 of a reversing switch 28, is connected to the indicator 25 or the galvanometer. When the bridge is unbalanced, pole 27 is moved either to the right or the left depending upon the direction of unbalance of the bridge. As the pole is moved to the right, for example, as it might be with a fluid velocity above a predetermined average velocity at which the bridge is balanced, the pole is disposed between right anvil 29 and hammer 30. This right anvil 29 and hammer 30 are electrical conducting elements. Hammer 30 is reciprocated by motor 31 which is driven by battery 32 through a jack shaft 33, bevel gears 34, crank 35, and rod 36. Motor 31 also rotates two solenoids 37 and 38 via jack shaft 33. Solenoid 37 is rotated by direct drive between gear 39 on the solenoid and pinion 40 on jack shaft 33. Solenoid 38 is rotated in an opposite direction to solenoid 37 by interposing a set of idler gears 42 between pinion 43 on jack shaft 33 and gear 44 on the solenoid. With pole 27 disposed between right anvil 29 and hammer 30, as hammer 30 is intermittently pressed down a circuit is completed through hammer 30, pole 27, and anvil 29. Battery 32 will thereupon energize solenoid 37. As this solenoid is energized, clutch plate 45 is urged downwardly against the face of the electromagnet and thus tends to rotate with electromagnet 37. A pin 46 in shaft 47 is disposed in a longitudinal slot 48 of clutch plate 45. This longitudinal slot restricts relative rotation but permits longitudinal motion between the clutch plate 45 and shaft 47. Therefore, clutch plate 45 being attracted to electromagnet 37, the shaft 47 is rotated in the same direction. Shaft 47 is provided with threads 49 and a nut 50. Nut 50 is preferably made of insulating material such as any of the phenol-formaldehyde type resins or the like. A slider or brush 51 is connected to nut 50 and rides upon variable resistor 23. A stylus 52 is also connected to nut 50 and is adapted to indicate or record on a chart 53 the position of the nut relative to the instrument. Chart 53 is preferably mounted on a cylinder 54 which may be rotated through shaft 55 by a clock or other substantially constant speed means (not shown). The rotation of shaft 47 is thus preferably driven by motor 31 through reduction gears and reversing clutches but in some cases a reversing motor or 2 motors driven in opposite directions directly or indirectly connected with shaft 47 can be adapted to drive nut 50, hammer 30 being driven continuously by a separate motor.

Shaft 47 being rotated by solenoid 37 as previously described, nut 50 is moved on threads 49. This movement of nut 50 slides the brush 51 along variable resistor 23. The movement of brush 51 on variable resistance 23 tends to return pole 27 to the left and to a neutral position. As the pole reaches a neutral position between right anvil 29 and left anvil 56, the circuit through hammer 30 and right anvil 29 is broken and therefore solenoid 37 is de-energized. The stylus 52 therefore indicates on chart 53 the position of brush 51 relative to variable resistance 23 in which the indicator 25 is in a null position and the bridge is balanced. Furthermore, the stylus indicates the velocity of fluid, either gaseous or liquid, past the velocity sensitive resistance 15.

As the velocity of fluid through chamber 14 and past resistance 15 is varied in an opposite direction by, for example, a decrease in fluid velocity below a predetermined average velocity at which the bridge is balanced, the Wheatstone bridge is unbalanced likewise in an opposite direction and the indicator 25 may accordingly be shifted to a position at the left. In such a position, pole 27 is disposed between hammer 30 and left anvil 56, closing a circuit through the switch to the upper solenoid 38 as hammer 30 is periodically depressed. As this solenoid is thus energized, clutch plate 45 is attracted to the lower face of the solenoid and by the friction between the solenoid face and the clutch plate, shaft 47 is driven with solenoid 38. Since solenoid 38 is turning in an opposite direction from solenoid 37, the direction of rotation of shaft 47 is opposite to its direction of rotation when clutch plate 45 is attracted by solenoid 37. Nut 50 and brush 51 are therefore moved in an opposite direction. This movement of brush 51 relative to variable resistor 23 tends, as previously described, to balance the bridge circuit and indicator 25 and pole 27 are again placed in a neutral position between right anvil 29 and left anvil 56.

It is sometimes desirable, in order to prevent an overload on motor 31, that a limiting switch 57 be incorporated in the control circuits for the positioning of nut 50 and brush 51. This limiting switch may consist of, for example, an upper flexible contact 58, a lower flexible contact 59 and a central flexible pole 61. Normally, there is a closed circuit through upper flexible contact 58, the central flexible pole 61, and the lower flexible contact 59. However, as nut 50 is raised, the nut lifts central flexible pole 61 by a rod 62 which has an upset head 63, breaking the electrical circuit between lower contact 59 and the central flexible pole 61; thus, even though the bridge is unbalanced and pole 27 is disposed between left anvil 56 and hammer 30, the motion of nut 50 is stopped and cannot be moved except by an unbalance of the bridge in an opposite direction whereby solenoid 37 is energized. The movement of nut 50 in a downward direction is also limited in the same manner when the nut strikes the lower upset 64 and breaks the circuit between upper flexible contact 58 and the central flexible pole 61.

In operation, a chart having markers for time correlation is placed in cylinder 54. Rotation of the cylinder is commenced by, for example, starting a clock. The variable impedance elements in the bridge are then adjusted so that the bridge will be balanced at substantially an average fluid velocity in the well. When the outer case is closed, the instrument is lowered into the well on a cable which is attached at the upper end of the outer case 10. Since the fluid produced by any well may be different from other wells, it is generally desirable, prior to making a survey of the fluid velocity in any well, particularly a producing well as distinguished from an input well, to calibrate the instrument for the particular fluid produced by that well. The instrument may be calibrated by locating it at any position in a well where the diameter is known as, for example, in the tubing. The well is then produced and the production rate recorded. From this data the operator obviously can determine the fluid velocity at the position of the instrument in the well. Generally, to calibrate the instrument the well is produced at 3 or more different production rates thereby providing preferably a substantial range of velocities encompassing the fluid velocity at the test section of the well. Each of these calibration tests are recorded on chart 53 at different times which may by time comparison be correlated with the actual well production and fluid velocity rates as kept at the surface.

After the flow meter is calibrated it is lowered to a position in the well where the actual fluid velocity is unknown; as for example, between two producing horizons. The well is then produced at a known rate for a reasonable length of time; for example, between about 5 and about 30 minutes so that the record produced by the stylus is long enough to be distinguished from other records on the chart. Obviously, any number of production tests may be made at several positions in the well and each production test may be distinguished from the others by time correlation with production tests at the surface. Sometimes it may be desirable, particularly where a fluid velocity test is made in an uncased hole, to consider hole diameter in the determination of fluid velocities and relative production rates or permeability profiles within the well. A well caliper survey may be made simultaneously with or independent of the fluid velocity survey.

Thus, I have described a preferred embodiment of my invention in the terms of a fluid velocity metering apparatus. Obviously, the well sensitive impedance may be varied by any other well characteristic. For example, variations in formation resistivity, radioactivity or the like may be impressed upon this well sensitivity impedance without departing from the spirit of the invention. It is thus to be understood that the invention is not to be construed as being limited to the particular embodiment described in detail. The invention is instead limited only by the scope of the appended claims.

I claim:

1. In well logging apparatus including a chart and means to indicate on said chart variations in a well characteristic, an electric motor energized from an adjacent source, two oppositely rotating electrically actuated clutches driven by said motor, a single rotatable shaft adapted on actuation of one of said clutches to drive the indicating means linearly, electrical means including at least one impedance responsive to a condition in said well for selectively actuating said clutches as said condition varies, and a cylindrical watertight case adapted to be lowered into a well enclosing all of said apparatus except said at least one impedance.

2. In well logging apparatus including a chart and a recording stylus to indicate on said chart variations in a well characteristic, an electric motor energized from an adjacent source, two oppositely rotating electrically actuated clutches driven by said motor, a single rotatable shaft adapted on actuation of one of said clutches to drive linearly said recording stylus, a bridge circuit including a well-sensitive impedance responsive to variations in a condition in said well, said circuit including an adjustable balancing impedance coupled to said stylus, an indicator responsive to unbalance of said bridge due to variations in said condition, means periodically actuated by said motor and responsive to the position of said indicator for selectively actuating one of said clutches, and a cylindrical watertight case adapted to be lowered into a well and enclosing all of said apparatus except said well-sensitive impedance.

3. An apparatus for continuously recording in a well the fluid velocity at a point in said well comprising a Wheatstone bridge having two arms in the fluid stream, both arms having substantially equal total resistance but having unequal cross-sectional areas to compensate for changes in temperature of said fluid stream, a variable resistance in said Wheatstone bridge, a brush in contact with said variable resistance, a galvanometer in a diagonal of said bridge circuit, an indicator arm on the armature of said galvanometer, a switch pole on said indicator arm, a right anvil and a left anvil both of said anvils being conductors and having a space therebetween, a motor, a hammer reciprocated by said motor, said switch pole, anvils and hammer coacting periodically to close a circuit through said hammer, said pole and one of said anvils when said bridge is unbalanced, two electromagnets driven in opposite directions on a threaded shaft by said motor, a clutch plate disposed on said shaft between said electromagnets, said clutch plate being keyed to rotate with said shaft but free to move axially along said shaft and contact independently the faces of said two electromagnets, a nut on said shaft, said brush being affixed to said nut, one of said electromagnets being energized and rotating said clutch plate and said shaft in one direction when said bridge is unbalanced in one direction and said circuit through said hammer, pole and one of said anvils is closed, the other of said electromagnets being energized and rotating said clutch and said shaft in the opposite direction when said bridge is unbalanced in the opposite direction and said circuit through said hammer, pole and the other of said anvils is closed, whereby the movement of said nut and said brush responds to the unbalance in said bridge and rebalances said bridge and whereby the movement of said nut is indicative of variations in said fluid velocity.

4. An apparatus according to claim 3 in which each of said electromagnets is de-energized as said nut approaches the limit of its travel resulting from energizing such electromagnet.

RENIC P. VINCENT.

REFERENCES CITED

The following references are of record in the file of this patent:

UNITED STATES PATENTS

| Number | Name | Date |
|---|---|---|
| Re. 22,637 | Keinath | Aug. 24, 1945 |
| 1,022,498 | Northrup | Apr. 9, 1912 |
| 1,691,600 | Brush, Jr., et al. | Nov. 13, 1928 |
| 2,425,733 | Gille et al. | Aug. 19, 1947 |

FOREIGN PATENTS

| Number | Country | Date |
|---|---|---|
| 18,563 | Great Britain | 1914 |